GEORGE LITTLE.
Improvement in the Arrangement of Circuits for Telegraphic Purposes.
No. 115,970.  Patented June 13, 1871.
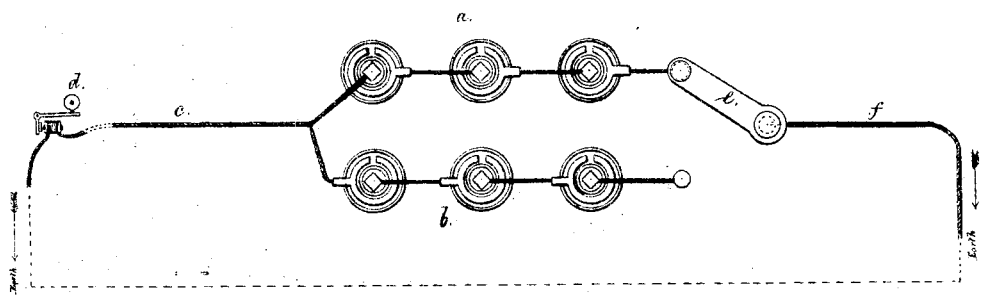

UNITED STATES PATENT OFFICE.

GEORGE LITTLE, OF RUTHERFORD PARK, NEW JERSEY.

IMPROVEMENT IN THE ARRANGEMENTS OF CIRCUITS FOR TELEGRAPHIC PURPOSES.

Specification forming part of Letters Patent No. 115,970, dated June 13, 1871.

*To all whom it may concern:*

Be it known that I, GEORGE LITTLE, of Rutherford Park, in the county of Bergen and State of New Jersey, have invented and made an Improvement in the Arrangement of Circuits for Telegraphic Purposes; and the following is declared to be a correct description thereof.

Before my invention telegraphs have been constructed in which the direction of the current has been reversed to effect two different indications at the receiving station, as in the English patent of H. and E. Highton, No. 12,039, A. D. 1848, or to perform two different operations, such as the movement of the type-wheel by pulsations of one polarity and the impressing of the paper by pulsations of the opposite polarity.

My invention does not relate to either of the aforesaid operations; but it consists in an arrangement of two batteries and connections with a reversing key or switch in such a manner that the act of reversing the polarity of the current and the disconnecting of one battery and the connecting of the other are performed simultaneously.

In practice it is found that a galvanic battery will operate to the best advantage when allowed periods of inaction with the circuits broken, and hence where the battery is constantly in operation the power is not as reliable and available as it would be if periodically thrown out of action. In my invention the two batteries are arranged with opposite poles connected to the main line, while at the other end a switch or key completes the earth connection from either one or the other; hence the act of switching one battery out of circuit brings into circuit a battery of opposite polarity to perform in that circuit operations that are different to those performed by pulsations of the opposite polarity.

In the annexed drawing, the batteries $a$ and $b$ are arranged with connections at one end to the main-line wire $c$, to the instrument $d$ at the distant station. $e$ is the switch or circuit-changing key, applied between the ground and return connection $f$ and the batteries $a$ $b$.

The polarity of the current from the battery $a$, when connected in the circuit with the switch $e$, will be positive; and from the battery $b$, when connected in the circuit with the switch $e$, will be negative; and the connection of one battery, the disconnection of the other, and the reversal of the polarity are simultaneous by the movement of the key or switch $e$; hence one battery can be at rest while the other is in operation, and the distant instrument is worked by pulsations of different polarity.

I am aware that two batteries have been arranged with connections to two switches, so that the switches would connect both ends of one of a pair of batteries to the instruments and the line, and that the reversing of the switches would change the polarity of the current. My arrangement is much more simple and equally effective.

I claim as my invention—

The arrangement of the batteries $a$ and $b$ with two opposite poles, connected to the main circuit, and with a switch, $e$, to connect either of the other two poles in the main circuit, as and for the purposes set forth.

Signed by me this 3d day of March, A. D. 1871.

GEORGE LITTLE.

Witnesses:
   CHAS. H. SMITH,
   GEO. T. PINCKNEY.